United States Patent
Liang

(10) Patent No.: US 7,308,556 B2
(45) Date of Patent: *Dec. 11, 2007

(54) DEVICE AND METHOD FOR WRITING DATA IN A PROCESSOR TO MEMORY AT UNALIGNED LOCATION

(75) Inventor: Bor-Sung Liang, Kaohsiung (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 421 days.

This patent is subject to a terminal disclaimer.

(21) Appl. No.: 10/989,408

(22) Filed: Nov. 17, 2004

(65) Prior Publication Data
US 2005/0138344 A1 Jun. 23, 2005

(30) Foreign Application Priority Data
Dec. 19, 2003 (TW) .............................. 92136303 A

(51) Int. Cl.
*G06F 12/04* (2006.01)
(52) U.S. Cl. ...................... 711/214; 711/154
(58) Field of Classification Search ................ 711/117, 711/154, 201, 214; 710/22; 708/209
See application file for complete search history.

(56) References Cited

U.S. PATENT DOCUMENTS

| 4,814,976 | A  | * | 3/1989  | Hansen et al.      | 711/201 |
| 5,168,561 | A  | * | 12/1992 | Vo                 | 710/22  |
| 5,295,250 | A  | * | 3/1994  | Komoto et al.      | 708/209 |
| 5,386,531 | A  | * | 1/1995  | Blaner et al.      | 711/201 |
| 5,740,398 | A  | * | 4/1998  | Quattromani et al. | 711/117 |
| 6,721,866 | B2 | * | 4/2004  | Roussel et al.     | 711/201 |
| 7,051,168 | B2 | * | 5/2006  | Gschwind et al.    | 711/154 |
| 2006/0010304 | A1 | * | 1/2006 | Homewood et al.   | 711/201 |

* cited by examiner

*Primary Examiner*—Matthew Kim
*Assistant Examiner*—Paul Schlie
(74) *Attorney, Agent, or Firm*—Bacon & Thomas, PLLC

(57) ABSTRACT

A device for writing data in a processor to memory at unaligned location. The data is stored in an internal register of the processor for writing to unaligned addresses of a memory partitioned by word boundaries into a plurality of words. A rotator is coupled to the internal register for rotating data of the internal register to a first position in accordance with written unaligned address. A store combine register is coupled to the rotator for temporarily storing data of the rotator. A mask selector is coupled to the rotator and the store combine register for selectively masking their data in accordance with the written unaligned address and storing the data masked to the memory.

20 Claims, 11 Drawing Sheets

```
LW    R1, (100)h        //[R1] = abcdh
SRL   R1, R1, 24        //Shift Right Logical 24 bits, [R1] = 000ah
SLL   R1, R1,24         // [R1]= a000h
SRL   R2, R16, 8        // [R2] = 0ABCh
OR    R1, R1, R2        // [R1]= aABCh
SW    R1, (100)h        // Store aABCh LW    R1, (100+4)h      // [R1] = efghh
SLL   R1, R1,8          // [R1] = fgh0h
SRL   R1, R1,8          // [R1] = 0fghh
SLL   R2, R16, 24       // [R2] = D000h
OR    R1, R1, R2        // [R1] = Dfghh
SW    R1, (100+4)h      // Store Dfgh
```

| Format | Meaning |
|---|---|
| SCB rD, [Addr] | Store Combine Begin |
| SCW rD, [Addr] | Store Combine Word |
| SCE [Addr] | Store Combine End |

STCR | a | b | c | d |     rD | A | B | C | D |     100h | X | Y | Z | W |

| | | Big Endian | | | | Little Endian | | |
|---|---|---|---|---|---|---|---|---|
| | Mode (Big) | MEM | Next STCR | Store Word? | | Mode (Little) | MEM | Next STCR | Store Word? |
| SCB | s=0 | ABCD | ABCD | YES | | s=0 | XYZA | BCDA | YES(mask) |
| | s=1 | XABC | DABC | YES(Mask) | | s=1 | XYAB | CDAB | YES(mask) |
| | s=2 | XYAB | CDAB | YES(Mask) | | s=2 | XABC | DABC | YES(mask) |
| | s=3 | XYZA | BCDA | YES(Mask) | | s=3 | ABCD | ABCD | YES(mask) |
| SCW | s=0 | ABCD | ABCD | YES | | s=0 | abcA | BCDA | YES |
| | s=1 | aABC | DABC | YES | | s=1 | abAB | CDAB | YES |
| | s=2 | abAB | CDAB | YES | | s=2 | aABC | DABC | YES |
| | s=3 | abcA | BCDA | YES | | s=3 | ABCD | ABCD | YES |
| SCE | s=0 | (not write) | (not set) | NO | | s=0 | abcW | (not set) | YES(Mask) |
| | s=1 | aYZW | (not set) | YES(Mask) | | s=1 | abZW | (not set) | YES(Mask) |
| | s=2 | abZW | (not set) | YES(Mask) | | s=2 | aYZW | (not set) | YES(Mask) |
| | s=3 | abcW | (not set) | YES(Mask) | | s=3 | (not write) | (not set) | NO |

DEVICE AND METHOD FOR WRITING DATA IN A PROCESSOR TO MEMORY AT UNALIGNED LOCATION

BACKGROUND OF THE INVENTION

1. Field of the Invention

The present invention relates to a technical field of data processing and, more particularly, to a device and method for writing data in a processor to memory at unaligned location.

2. Description of Related Art

While a processor performs data processing, data alignment may affect the performances of many key operations, such as the operations of string, array and the like. As shown in FIG. 1, data to be processed, such as letters 'ABCDEFGHIJKL', normally exceeds the boundary or boundaries when writing it from registers R16, R17 and R18 to a memory 100 at addresses 101h to 10Ch. As such, since the memory 100 cannot process data, a processor must execute many additional operations before the data is stored in the memory 100 at unaligned location.

Upon this problem, a typical scheme is that after the data is loaded from the memory 100 at the unaligned location to the processor, various instructions in the processor are applied for obtaining required data. As shown in FIG. 2, for writing a data 'ABCD' to the unaligned location in the memory 100, data 'abcd' at address 100h is loaded to register R1 firstly to shift right 24 bits for saving required data 'a', and then shift left 24 bits for placing the data 'a' in position. Next, data 'ABCD' in register R16 is shifted right by eight bits and then stored in register R2 (0ABC). Next, an OR operation is applied to registers R1 and R2 to obtain a result to be stored in register R1 (aABC). Next, data 'efgh' at address 104h is loaded to register R1 firstly to shift left eight bits for saving required data 'fgh', and then shift right eight bits for placing the required data 'fgh' in suitable position. Next, data ABCD in register R16 is shifted left by 24 bits and then stored in register R2 (D000). Next, an OR operation is applied to registers R1 and R2 to obtain a result to be stored in register R1 (Dfgh). Finally, the content (Dfgh) of register R1 is written into the memory 100 at address 104h.

As cited, if a required length of unaligned data to be stored is n words (each having 32 bits), the typical scheme requires 12n instructions to describe the store operation and at least 12n instruction cycles to complete the store operation, which needs large memory space for storing required program codes and also increase processor load so as to result in poor performance.

Upon this problem, U.S. Pat. No. 4,814,976 granted to Hansen, et al. for a "RISC computer with unaligned reference handling and method for the same" performs the alignment as loading unaligned data and stores a data exceeding the boundary completely by two times. As shown in FIG. 3, data ABC in register R16 is written to memory addresses 101h to 103h. In this case, data at memory address 100h is unchanged. Next, data D in register 16 is written to memory address 104h. In this case, data in memory addresses 105h to 107h is unchanged. Similarly, contents of registers R17 and R18 are written sequentially to memory addresses 105h to 10Ch respectively.

As cited, if a required length of unaligned data to be loaded is n words, it needs 2n instructions to describe store operation and at least 2n instruction cycles to complete the store operation. Since read and write are repeated at the same memory position and register, the processor pipeline stall can be increased and the bus bandwidth is wasted. Especially to some systems without cache, delay can be obvious.

Therefore, it is desirable to provide an improved device and method for loading unaligned data to mitigate and/or obviate the aforementioned problems.

SUMMARY OF THE INVENTION

The object of the present invention is to provide a device and method for writing data in a processor to memory at unaligned location, which can avoid the prior problem and reduce required instruction cycles to complete data write operation, thereby increasing performance.

In accordance with one aspect of the present invention, there is provided a method for writing data in a processor to memory at unaligned location, wherein the data is to be written to unaligned addresses of a memory partitioned by word boundaries into a plurality of m (positive integer)-bit words. The method includes: a first rotating step, a first mask writing step, a second rotating step, a first writing step, a third rotating step, a second writing step and a second mask writing step. The first rotating step fetches the data and rotates it to a first position in accordance with written unaligned address, thereby generating a first rotated data. The first mask writing step masks the first rotated data in accordance with written unaligned address of the data and then writes it to the memory. The second rotating step fetches a second data next to the data and rotates it to the first position in accordance with the written unaligned address of the second data, thereby generating a second rotated data. The first writing step combines the unwritten part of the first rotated data and a part of the second rotated data to obtain a first combination and writes the first combination to the memory. The third rotating step rotates the third data next to the second data in accordance with written the unaligned address of the third data to the first position, thereby generating a third rotated data. The second writing step combines unwritten part of the second rotated data and a part of the third rotated data to form a second combination and writes the second combination to the memory. The second mask writing step masks the third rotated data and then writes it to the memory.

In accordance with another aspect of the present invention, there is provided a method for writing data to memory at unaligned location, wherein the data is to be written to unaligned addresses of a memory partitioned by word boundaries into a plurality of m (positive integer)-bit words. The memory has a plurality of m-bit words partitioned by word boundaries. The method includes: a start rotating step, a first mask writing step and a second mask writing step. The start rotating step fetches the data and rotates it to a first position in accordance with written unaligned address of the data, thereby generating a first rotated data. The first mask writing step masks the first rotated data in accordance with the written unaligned address and then writes it to the memory. The second mask writing step masks unwritten part of the first rotated data and then writes it to the memory.

In accordance with a further aspect of the present invention, there is provided a device for writing in a processor to memory at unaligned location, wherein the data is stored in an internal register of the processor for writing to unaligned addresses of a memory. The memory is partitioned by word boundaries into a plurality of m (positive integer)-bit words. The device includes a rotator, a store combine register and a mask selector. The internal register temporarily stores data. The rotator is coupled to the internal register for rotating the data of the internal register to a first position in accordance with written unaligned address of the data. The store combine register is coupled to the rotator for temporarily storing data of the rotator. The mask selector is coupled to the rotator and the store combine register for selectively masking their data in accordance with the written unaligned address and storing their data masked to the memory.

Other objects, advantages, and novel features of the invention will become more apparent from the following detailed description when taken in conjunction with the accompanying drawings.

BRIEF DESCRIPTION OF THE DRAWINGS

FIG. 5 is a table depicting instruction formats in accordance with the invention;

FIG. 9 is a table illustrating the execution of SCB, SCW and SCE instructions in accordance with the invention;

DETAILED DESCRIPTION OF THE PREFERRED EMBODIMENT

Figure 1:
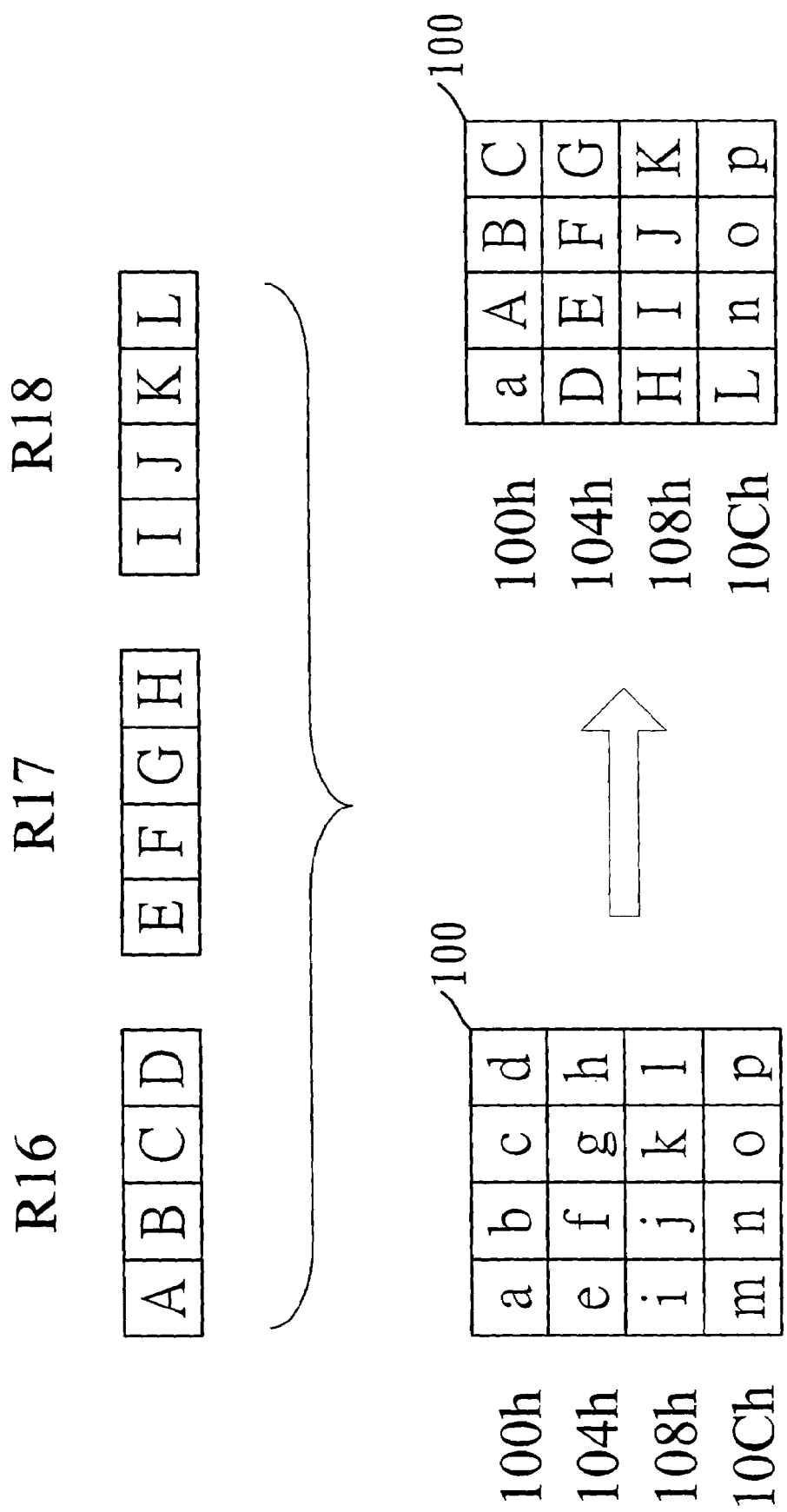
FIG. 1 is a schematic diagram for writing a set of register data to a memory at unaligned location.
Figure 2:
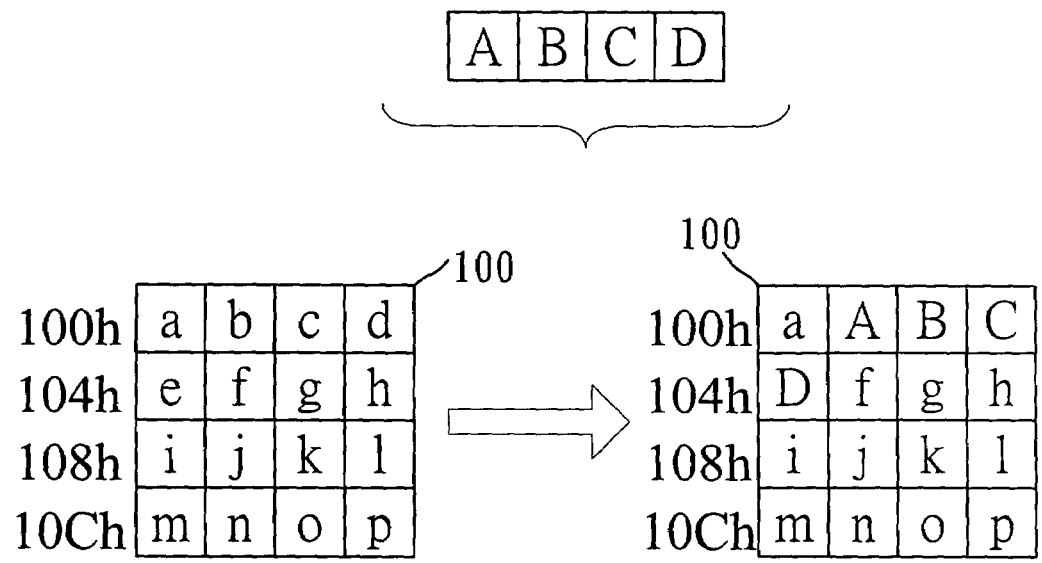
FIG. 2 is a schematic diagram illustrating conventional program codes for storing a set of register data to a memory at unaligned location.
Figure 3:
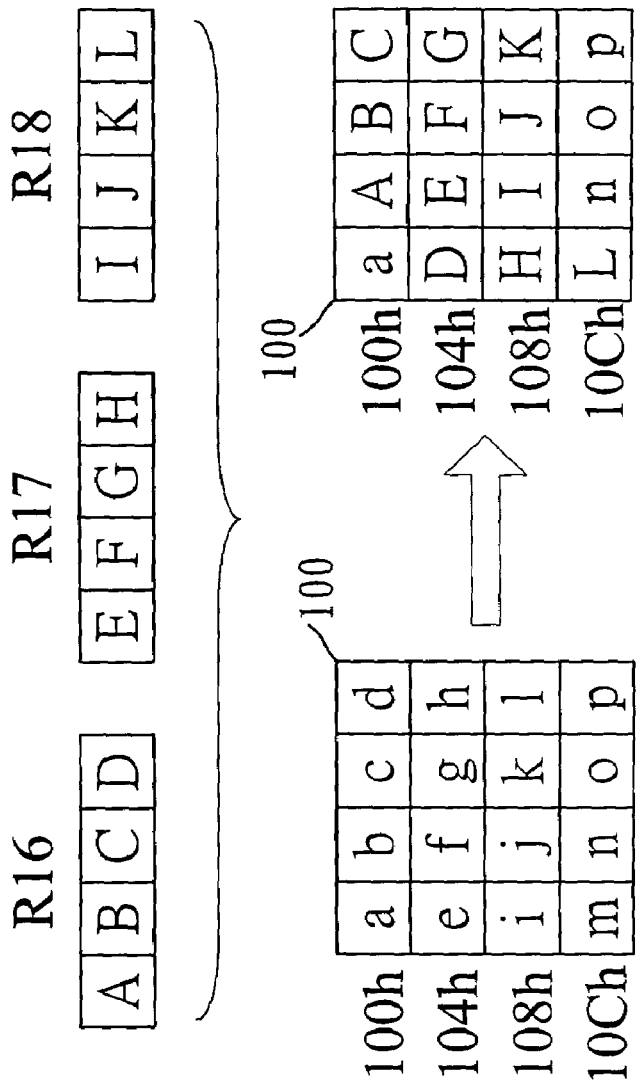
FIG. 3 is a schematic diagram illustrating another conventional program codes for storing a set of register data to a memory at unaligned location.
Figure 4:
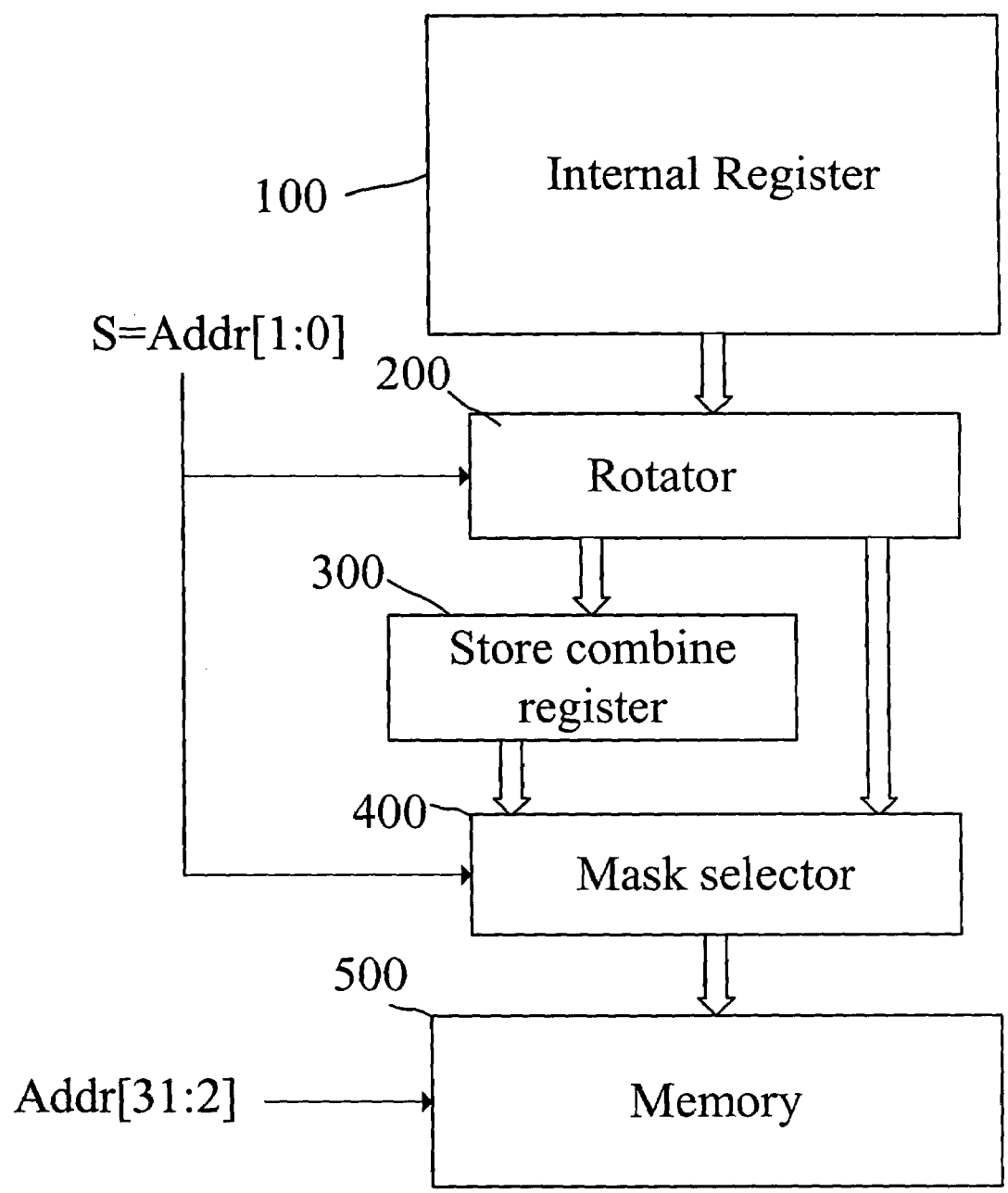
FIG. 4 is a block diagram of a device for writing data in processor to memory at unaligned location in accordance with the invention.

FIG. 4 is a block diagram of a device for writing data in a processor to memory at unaligned location in accordance with the invention. As shown, the device includes a rotator 200, a store combine register (STCR) 300 and a mask selector 400. The data is stored in an internal register 100 of the processor and written to a memory 500 at unaligned location. The memory 500 has a plurality of m-bit words partitioned by word boundaries. In this embodiment, m is preferred to be 32, i.e., the memory 500 consists of a plurality of 32-bit words.

The rotator 200 is coupled to the internal register 100 for rotating the data of the internal register 100 to a first position in accordance with the written unaligned address of the data. The STCR 300 is coupled to the rotator 200 for temporarily storing data of the rotator 200. The mask selector 400 is coupled to the rotator 200 and the STCR 300 for selectively masking their data in accordance with the written unaligned address of the data and writing the data masked to the memory 500.

Three instructions SCB (Store Combine Begin), SCW (Store Combine Word) and SCE (Store Combine End) are defined in the invention to generate corresponding control signals to the rotator 200, the store combine register 300 and the mask selector 400. The three instructions have formats shown in FIG. 5.

Figure 6:
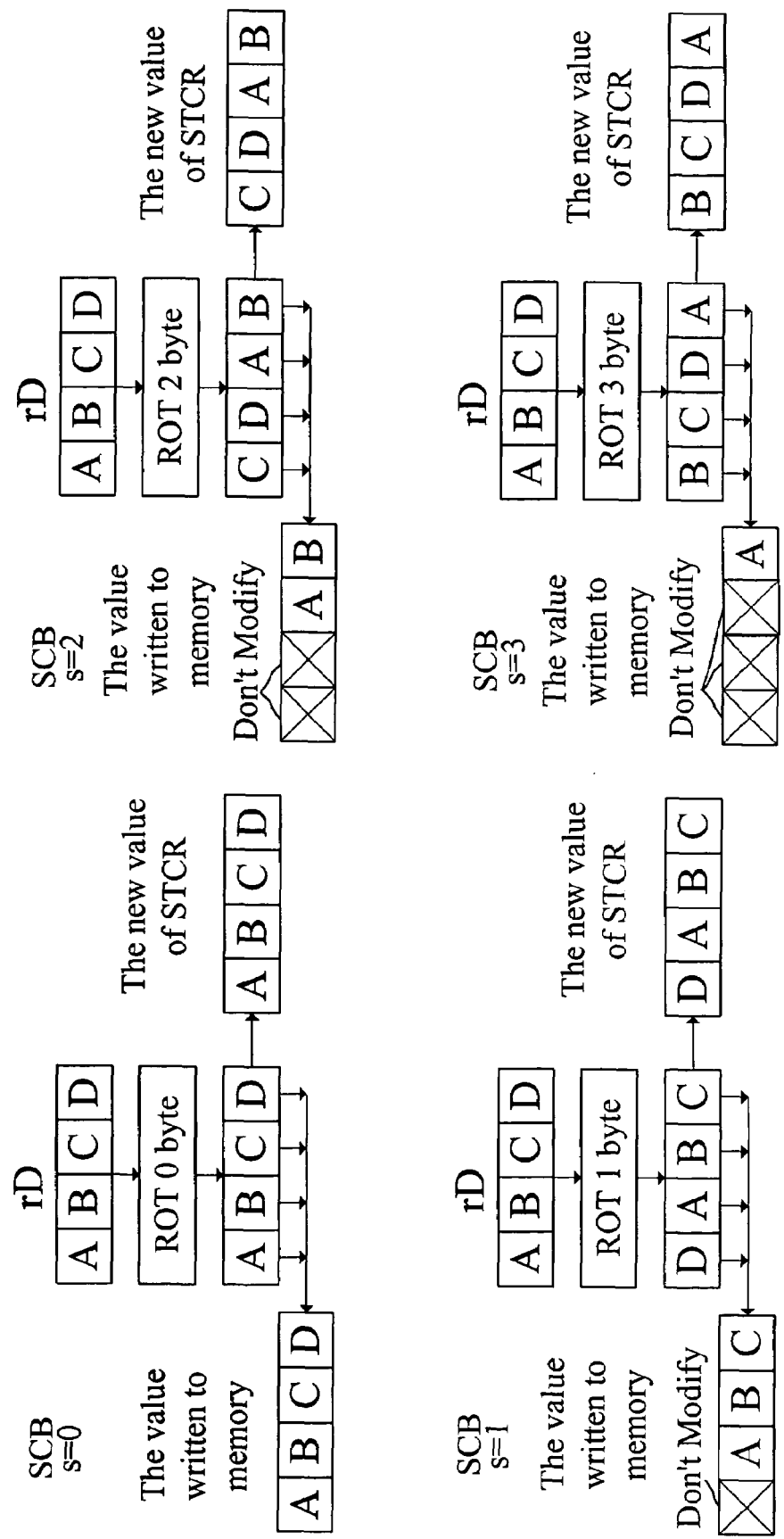
FIG. 6 schematically illustrates SCB instruction in accordance with the invention.

As shown in FIG. 6, instruction SCB rD, [Addr] rotates the content of register rD by 0-, 1-, 2- and 3-byte respectively in accordance with the written address Addr(s=Addr[1:0]) and writes the rotated content to the STCR 300. In addition, the rotated content is masked by 0-, 1-, 2- and 3-byte respectively in accordance with the written address Addr(s=Addr[1:0]) and then written to the memory 500. For example, instruction SCB R16, [101h] rotates the content of register R16 by one byte in accordance with the written address 101h(s=1) and then writes the rotated content to the STCR 300. In addition, the rotated content is masked by one byte and then written to the memory 500 at address 101h. Thus, if the content of register R16 is 'ABCD' and the execution of SCB R16, [101h] is complete, the content of the STCR 300 is 'DABC', the contents of memory addresses 101h to 103h are 'ABC', and the content of memory address 100h is unchanged.

Figure 7:
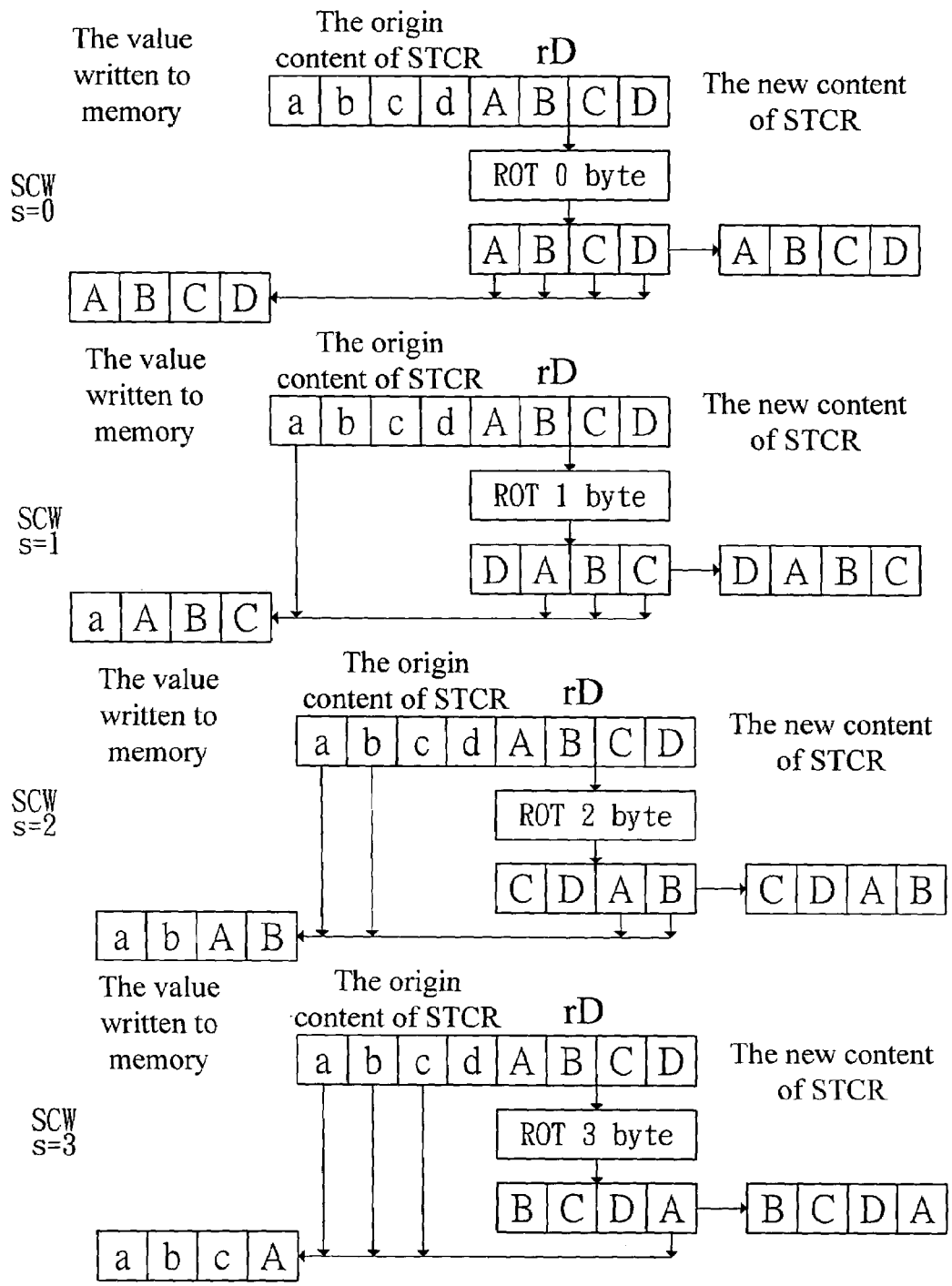
FIG. 7 schematically illustrates SCW instruction in accordance with the invention.

As shown in FIG. 7, instruction SCW rD, [Addr] rotates and then masks the content of register rD by 0-, 1-, 2- and 3-byte respectively in accordance with the written address Addr(s=Addr[1:0]), next combines the masked content and bytes stored in the STCR 300, and then writes the combined content to the memory 500, and finally writes the rotated content of the register rD to the STCR 300. For example, instruction SCW R16, [101h] rotates the content 'ABCD' of register R16 by one byte in accordance with the written address 101h(s=1) to thus obtain the content 'DABC' and masks the content 'DABC' by one byte 'D' in accordance with the written address 101h(s=1), next combines bytes 'abcd' stored in the STCR 300 and the masked content into the content 'aABC', and then writes the content 'aABC' to the memory 500 at address 101h, and finally writes the content 'DABC' of the register rD to the STCR 300. Thus, when the execution of SCB R16, [101h] is complete, the content of the STCR 300 is 'DABC', the contents of memory addresses 101h to 103h are 'ABC', and the content of memory address 100h is 'a'.

Figure 8:
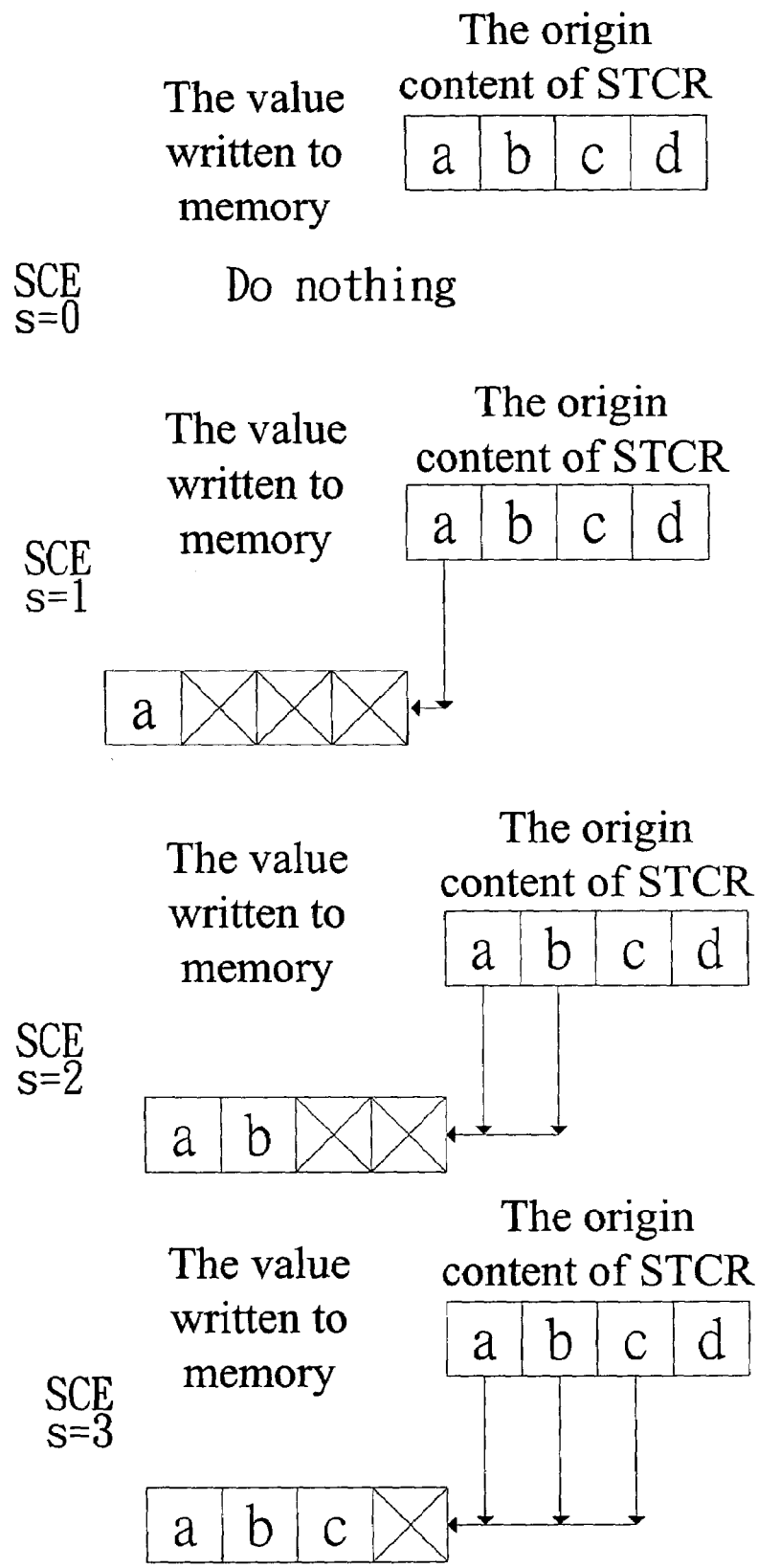
FIG. 8 schematically illustrates SCE instruction in accordance with the invention.

As shown in FIG. 8, instruction SCE [Addr] masks the content of the STCR 300 by 0-, 1-, 2- and 3-byte respectively in accordance with the written address Addr(s=Addr [1:0]) and then writes the masked content to the memory 500. For example, instruction SCE [101h] masks the content 'abcd' by three bytes 'bcd' in accordance with the written address 101h(s=1) and then writes the content 'a' to the memory 500 at address 100h. Thus, when the execution of SCE [101h] is complete, the contents of memory addresses 101h to 103h are unchanged and the content of memory address 100h is 'a'.

FIG. 9 shows a summary table of executing the instructions SCB rD, [Addr], SCW rD, [Addr] and SCE [Addr] under data arrangement of little endian and big endian. As shown, for data 'abcd' in the STCR 300, data 'XYZW' in the memory 500 at addresses 100h to 103h and data 'ABCD' in register rD, s=O represents Addr=4N (positive integer), s=1 represents Addr=4N+1, s=2 represents Addr=4N+2, and s=3 represents Addr=4N+3.

Figure 10:
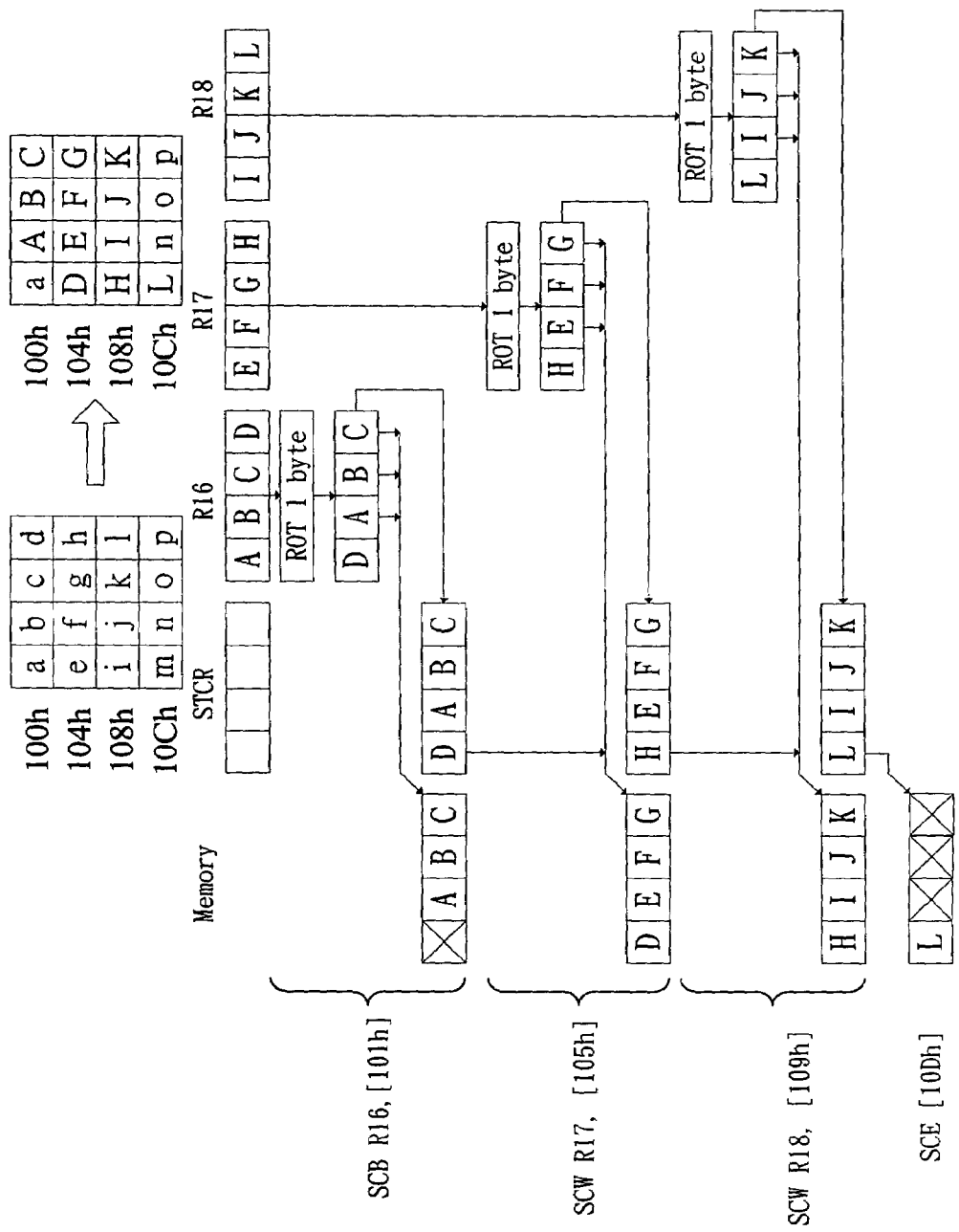
FIG. 10 shows an example of the invention.

FIG. 10 shows an example of the invention. As shown, for writing data 'ABCDEFGHIJKL' in registers R16-R18 to memory 500 at addresses 101h-10Ch, an instruction SCB R16, [101h] is executed firstly to rotate the content 'ABCD' of register R16 by one byte in accordance with the written address 101h(s=1) to thus obtain 'DABC' (first rotating step) and then write the content 'DABC' to STCR 300. Next, the content 'DABC' is masked by one byte in accordance with the written address 101h (s=1) and then written to the memory 500 at addresses 101h-103h (first mask writing step). Therefore, after the instruction SCB R16, [101h] is executed completely, the STCR 300 has a content 'DABC', the contents of memory addresses 101h to 103h are 'ABC', and the content of memory address 101h is unchanged as 'a'.

Next, an instruction SCW R17, [105h] is executed to firstly rotate the content 'EFGH' of register R17 by one byte in accordance with the written address 105h(s=1) to obtain 'HEFG' (second rotating step), next mask the content 'HEFG' by one byte ('H') in accordance with the written address 105h(s=1) and then combine with the content 'DABC' in the STCR 300 to form 'DEFG' to be written to the memory 500 in four bytes of addresses 104h-107h that contains the address 105h (first writing step), and finally the content 'HEFG' of register 17 rotated is written to the STCR 300. Therefore, after the instruction SCW R17, [105h] is executed completely, the STCR 300 has a content 'HEFG' and the contents of memory addresses 104h to 107h are 'DEFG'.

Then, an instruction SCW R18, [109h] is executed to firstly rotate the content 'IJKL' of register R18 by one byte in accordance with the written address 109h(s=1) to obtain LIJK (second rotating step), next mask the content 'LIJK' by one byte ('L') in accordance with the written address 109h (s=1) and then combine with the content 'HEFG' in the STCR 300 to form 'HIJK' to be written to the memory 500 in four bytes of addresses 108h-10Bh that contains the address 109h (second writing step), and finally the content 'IJKL' of register 18 rotated is written to the STCR 300. Therefore, after the instruction SCW R18, [109h] is executed completely, the STCR 300 has a content 'LIJK' and the contents of memory addresses 108h to 10Bh are 'HIJK'.

Finally, an instruction SCE [10Dh] is executed to mask the content 'LIJK' of the STCR 300 by three bytes ('IJK') in accordance with the written address 10Dh(s=1) and write the result ('L') to the memory 500 at address 10Ch (second mask writing step). Therefore, after the instruction SCE [10Dh] is executed completely, the STCR 300 has a content 'LIJK', the contents of memory addresses 10Dh to 10Fh are unchanged respectively with 'n', 'o' and 'p', and memory address 10Ch has a content 'L'.

Figure 11:
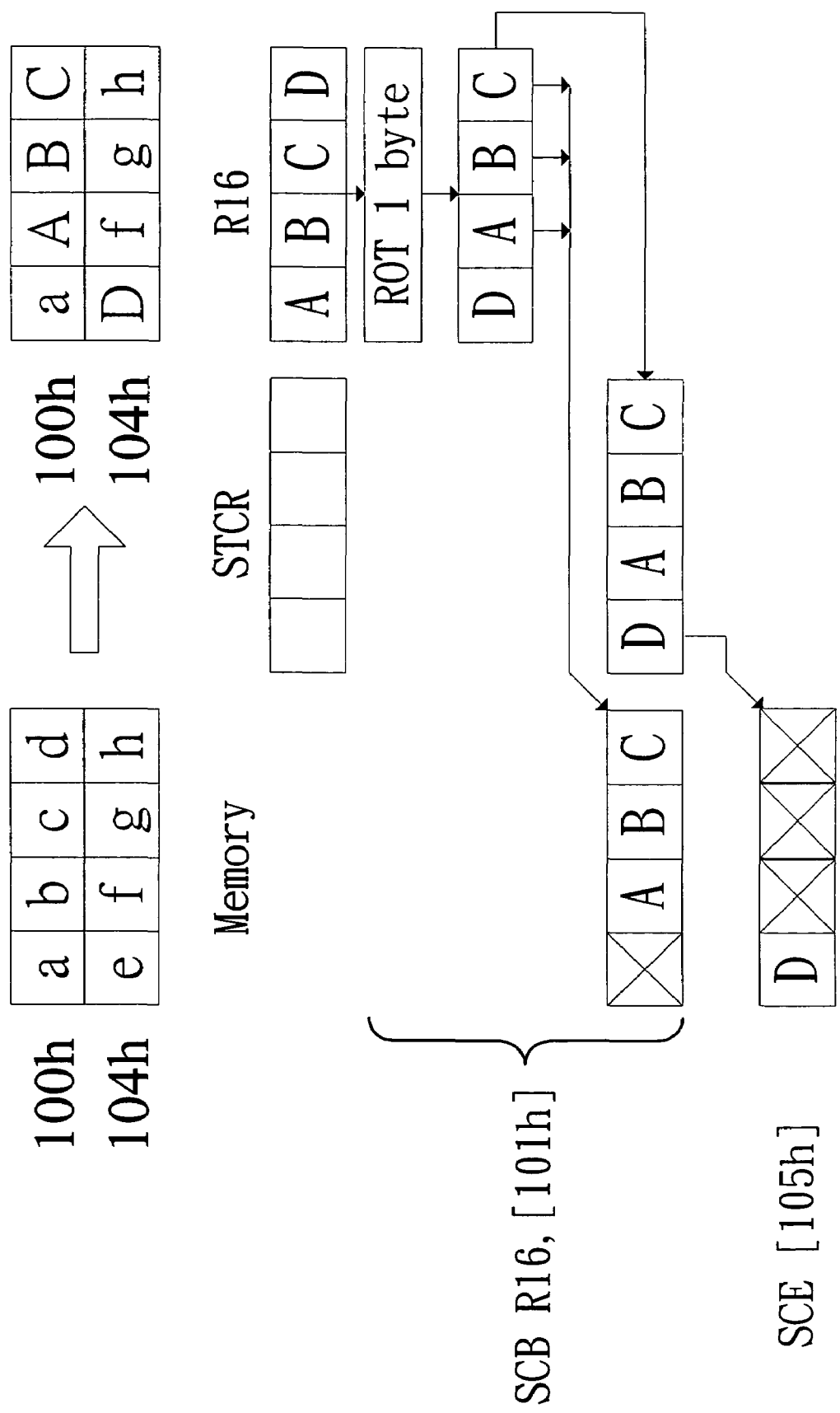
FIG. 11 shows another example of the invention.

FIG. 11 shows another example of the invention. As shown, for writing data 'ABCD' in registers R16 to memory 500 at addresses 101h-104h, an instruction SCB R16, [101h] is executed firstly to rotate the content 'ABCD' of register R16 by one byte in accordance with written address 101h (s=1) to thus obtain DABC and then write the content 'DABC' to STCR 300. Next, the content 'DABC' is masked by one byte in accordance with written address 101h (s=1) and then written to the memory 500 at addresses 101h-103h. Therefore, after the instruction SCB R16, [101h] is executed completely, the STCR 300 has a content 'DABC', the contents of memory addresses 101h to 103h are 'ABC', and the content of memory address 101h is unchanged as 'a'.

Next, an instruction SCE [105h] is executed to mask the content 'DABC' of the STCR 300 by three bytes ('ABC') in accordance with the written address 105h(s=1) and write the result ('D') to the memory 500 at address 104h. Therefore, after the instruction SCE [105h] is executed completely, the STCR 300 has a content 'DABC', the contents of memory addresses 105h to 107h are unchanged respectively with 'f', 'g' and 'h', and memory address 104h has a content 'D'.

In view of the foregoing, it is known that, if a required length of unaligned data to be written to memory 500 is n words, the invention can describe store operation only by (n+1) instructions, which requires only (n+1) instruction cycles to complete the write operation, thereby reducing codes and relatively increasing performance. In addition, repeated read/write does not occur on the same memory or register position, and thus the stall probability of a processor pipeline is reduced. Furthermore, content of the same memory position is loaded only one time as it is required, and thus bus bandwidth is saved to reach the best utilization.

Although the present invention has been explained in relation to its preferred embodiment, it is to be understood that many other possible modifications and variations can be made without departing from the spirit and scope of the invention as hereinafter claimed.

What is claimed is:

1. A method for writing data in a processor to memory at unaligned location, wherein the data is to be written to unaligned addresses of a memory partitioned by word boundaries into a plurality of m (positive integer)-bit words, the method comprising:

a first rotating step, which fetches the data and rotates it to a first position in accordance with written unaligned address, thereby generating a first rotated data;

a first mask writing step, which masks the first rotated data in accordance with the written unaligned address of the data and writes the first rotated data masked to the memory;

a second rotating step, which fetches a second data next to the data and rotates the second data to the first position in accordance with the written unaligned address of the second data, thereby generating a second rotated data;

a first writing step, which combines unwritten part of the first rotated data and a part of the second rotated data to form a first combination and writes the first combination to the memory;

a third rotating step, which rotates the third data next to the second data in accordance with written unaligned address of the third data to the first position, thereby generating a third rotated data;

a second writing step, which combines unwritten part of the second rotated data and a part of the third rotated data to form a second combination and writes the second combination to the memory; and a second mask writing step, which masks the third rotated data and writes the third rotated data masked to the memory.

2. The method as claimed in claim 1, wherein m is 32.

3. The method as claimed in claim 1, wherein the rotating steps rotate right by eight bits to the first position respectively.

4. The method as claimed in claim 1, wherein the rotating steps rotate right by 16 bits to the first position respectively.

5. The method as claimed in claim 1, wherein the rotating steps rotate right by 24 bits to the first position respectively.

6. A method for writing data in a processor to memory at unaligned location, wherein the data is to be written to unaligned addresses of a memory partitioned by word boundaries into a plurality of m (positive integer)-bit words, the method comprising:

a start rotating step, which fetches the data and rotates it to a first position in accordance with written unaligned address of the data, thereby generating a first rotated data;

a first mask writing step, which masks the first rotated data in accordance with the written unaligned address and writes the first rotated data masked to the memory; and a second mask writing step, which masks unwritten part of the first rotated data and writes the unwritten part masked to the memory.

7. The method as claimed in claim 6, wherein the unwritten part has a size less than m bits.

8. The method as claimed in claim 6, wherein m is 32.

9. The method as claimed in claim 6, wherein the rotating step rotates right by eight bits to the first position.

10. The method as claimed in claim 6, wherein the rotating step rotates right by 16 bits to the first position.

11. The method as claimed in claim 6, wherein the rotating step rotates right by 24 bits to the first position.

12. A device for writing data in a processor to memory at unaligned location, wherein the data is stored in an internal register of the processor for writing to unaligned addresses of a memory partitioned by word boundaries into a plurality of m (positive integer)-bit words, the device comprising:

a rotator, which is coupled to the internal register for rotating data of the internal register to a first position in accordance with written unaligned address;

a store combine register, which is coupled to the rotator for temporarily storing data of the rotator; and a mask selector, which is coupled to the rotator and the store combine register for selectively masking their data in accordance with the written unaligned address and storing the data masked to the memory.

13. The device as claimed in claim 12, wherein the processor executes a first instruction such that the rotator rotates data of the internal register to the first position in accordance with written unaligned address of the data, thereby generating a first rotated data and stores the first rotated data temporarily to the store combine register, and then the mask selector selectively masks data of the rotator and the store combine register in accordance with the written unaligned address and writes their data masked to the memory.

14. The device as claimed in claim 12, wherein the processor executes a second instruction such that the rotator fetches a second data next to the data and rotates the second data to the first position, thereby generating a second rotated data and stores the second rotated data temporarily to the store combine register, and then the mask selector combines unwritten part of the first rotated data and a part of the second rotated data in accordance with written unaligned address of the second data to form a first combination and writes the first combination to the memory.

15. The device as claimed in claim 14, wherein the processor executes a third instruction such that the rotator fetches a third data next to the second data and rotates the third data to the first position, thereby generating a third rotated data and stores the third rotated data temporarily to the store combine register, and then the mask selector combines unwritten part of the second rotated data and a part of the third rotated data in accordance with written unaligned address of the third data to form a second combination and writes the second combination to the memory.

16. The device as claimed in claim 15, wherein the mask selector rotates unwritten part of the third rotated data in accordance with the written address of the third data and writes the unwritten part of the third rotated data masked to the memory.

17. The device as claimed in claim 12, wherein m is 32.

18. The device as claimed in claim 12, wherein the rotator rotates right by eight bits to the first position.

19. The device as claimed in claim 12, wherein the rotator rotates right by 16 bits to the first position.

20. The device as claimed in claim 12, wherein the rotator rotates right by 24 bits to the first position.

* * * * *